Oct. 19, 1965    J. C. BENESH ETAL    3,212,820
PNEUMATIC CONVEYOR MEANS FOR FRAGILE ELEMENTS
Original Filed Jan. 12, 1962
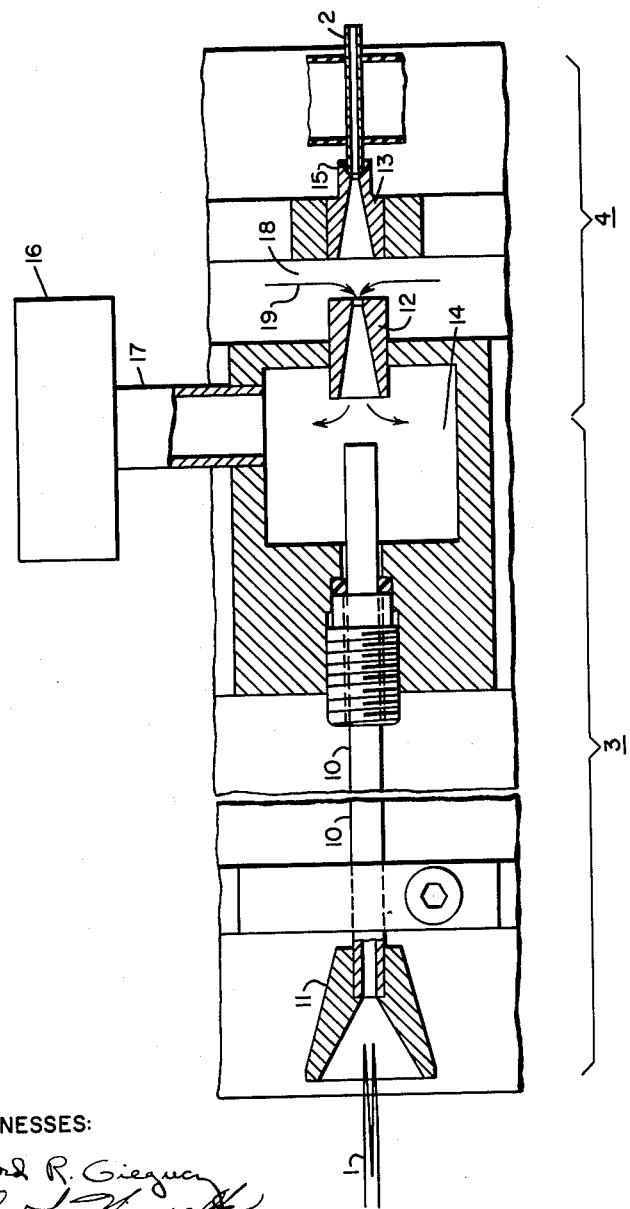
WITNESSES:
INVENTORS
Joseph C. Benesh and
Edward P. Lavernoich.
BY
ATTORNEY United States Patent Office 3,212,820
Patented Oct. 19, 1965

3,212,820
PNEUMATIC CONVEYOR MEANS FOR
FRAGILE ELEMENTS
Joseph C. Benesh, Bath, N.Y., and Edward P. Lavernoich, Berlin, N.H., assignors to Westinghouse Electric Corporation, Pittsburgh, Pa., a corporation of Pennsylvania
Continuation of abandoned application Ser. No. 165,816, Jan. 12, 1962. This application June 19, 1964, Ser. No. 377,181
3 Claims. (Cl. 302—2)

This application is a continuation of Serial No. 165,816, filed January 12, 1962, assigned to the same assignee, and now abandoned.

This invention relates to the art of conveying fragile elements, and more particularly to improved pneumatic conveying apparatus for inserting and assembling fragile heater elements in the cathodes of electron discharge devices.

In the manufacture of electron tubes, the insertion of the heater elements into the cathode sleeves presents a delicate assembly operation. Heretofore, it has been conventional to perform this delicate assembling operation manually. These heater elements take different forms, such as a folded strand wire construction, similar to that shown and described in U.S. Patent 2,913,805, issued to C. F. Miller et al. on November 24, 1959. Also the heater elements may be in the form of a continuous coil of resistance wire, such as tungsten wire, bent to the hairpin shape. In both instances the wire is coated with an insulating material. The folded type is the most commonly used in the manufacture of electron discharge tubes and presents the greatest difficulty in assembling operations. The insulating coating on such heaters is usually made of refractory material which is relatively brittle and, therefore, requires very delicate assembly operations.

Although heretofore pneumatic conveyor devices have been employed for inserting these delicate heater elements into cathode sleeves, these prior devices have had certain disadvantages which has necessitated the establishment of many expensive controlled dimensional factors and proper conditions in order to ensure the success of the assembling operation.

It is, therefore, a primary object of this invention to provide an improved conveyor means for conveying and guiding lightweight fragile heater elements from a point of convenience into cathode sleeves.

Another object is to provide improved means of the type generally described for conveying lightweight, delicate articles into a final assembled position in which they are held by friction.

A further object is to provide an improved apparatus of the type described in which pneumatic conveying means is provided for conveying and directing the light fragile articles toward a final position in which the conveying medium is disassociated from the conveyed article, the latter being permitted to proceed to its final position under the force of its own momentum.

Another object is to provide a novel and improved pneumatic conveying apparatus for conveying a fragile lightweight article from a point of convenience to a predetermined assembled position in which there is an accelerating section axially aligned with a decelerating section wherein the article is accelerated to a point where the conveying medium is directed away from the axis of the sections permitting the article to continue in its initial path under its own momentum, the article being decelerated by the pneumatic medium flowing in the opposite direction in the decelerating section.

The novel features that are considered characteristic of this invention are set forth with particularity in the appended claims. The invention itself, however, both as to its organization and method of operation as well as additional objects and advantages will best be understood from the following description when read in connection with the accompanying drawing, in which the single figure is an elevational view, partially in section, of a schematic representation of an embodiment of the present invention.

Briefly speaking, the present invention provides pneumatic conveyor and assembling means for lightweight fragile articles, such as heater elements for cathodes of electron discharge devices comprising, pneumatic means for conveying and imparting sufficient acceleration to such articles for carrying them under their own momentum through a portion of their path from a point of convenience to their assembled position with another part, appropriate means being provided near the end of the pneumatic conveyor path for disassociating the accelerating influence of the pneumatic conveyor medium from the articles and applying a decelerating pneumatic influence on said articles, the decelerating pneumatic influence and the friction between the article and the part being relied upon to determine the final assembled position. A salient feature resides in the means for providing such acceleration and deceleration without having the pneumatic medium disturb the articles after reaching their final assembled position.

In the embodiments of the invention illustrated in the drawings, there is shown pneumatic conveyor apparatus having a passageway for conveying an article, such as a heater element 1 for an electron discharge device, from a place of convenience to its final assembled position, such as in the cathode sleeve 2 of such device. The passageway may be considered as comprising an acceleration section 3 and a decelerating section 4 which are in axial alignment with each other. Suitable means are provided for causing a pneumatic conveying medium, preferably air, to flow through these two sections in opposite directions, the air being caused to flow away from the adjacent ends of the sections in such manner that the path of the conveyed article will not be deviated from the axis of the passage. The accelerating section 3 is the longer of the two sections by an amount sufficient to enable it to impart sufficient momentum to the conveyed articles to carry them through the deceleration section 4 and to a gentle stop in the final assembled position in the cathode sleeve 2, both ends of which are open.

To this end, the accelerating section 3 is in the form of an entrance portion or launching tube 10 having a funnel 11, constituting the loading tip, into which the fragile heater elements may be placed by an operator. The decelerating section 4 includes a discharge portion or nozzle 12, a funnel bushing or guide member 13 and a portion of the cathode sleeve 2 all of which are arranged in axial alignment and with the mouths of the nozzle 12 and funnel bushing 13 disposed toward the launching tube 10. The funnel bushing 13 is provided with a recess 15 which serves as a guide for properly aligning a cathode sleeve 2 with the passage in the bushing 13. In the embodiment shown in the drawing, a source of negative pressure is utilized for causing high velocity air streams to flow from the outer respective ends of the tube 10 and the nozzle 12 toward their respective adjacent inner ends. To accomplish this the tube 10 and the nozzle 12 are in airtight engagement with the walls of a chamber 14 which is connected to a source of negative pressure, such as a vacuum pump 16 or an equivalent device, through a suitable conduit 17. The capacity of the vacuum pump 16 is so related to the circular cross sectional area of the launching tube 10 and that of the passage in the nozzle 12 that there is a low pressure zone maintained around the inner end of the launching tube 10 and the mouth of the nozzle 12. The volume of the chamber 14 is of sufficient magnitude that the high velocity air flowing from the inner ends of the tube 10 and the mouth of the nozzle 12 expands uniformly radially outwardly into the chamber. Because the air expands radially in all directions, it will not cause articles being conveyed, such as a heater element 1, to deviate from its projected path through the space between the inner end of tube 10 and the mouth of the nozzle 12.

The mouth of the funnel bushing 13 is spaced from the outer end of the nozzle 12, as at gap 18, so that the air flowing into the outer end of the nozzle 12, as represented by the arrows 19, will not develop a low pressure zone at the mouth of the bushing and, therefore, will not tend to withdraw a heater element after it has come to rest in the open-ended cathode sleeve 2 when the latter is in gas-tight engagement with the bushing 13.

The capacity of the vacuum pump 16 is so chosen in relation to the other factors, such as the relative length and size of the passages in the tube 10, the nozzle 12 and the friction between a heater element 1 and the inside of cathode sleeve 2 that the heater element entering the loading tip will be drawn into the tube 10 at high velocity and will be conveyed into the cathode sleeve where it will come to a gradual and gentle stop at the desired point under the final arresting action of the friction between the heater element and the inside of the sleeve. Merely for the purpose of giving the parameters of a working example and not by way of limitation, apparatus of the type described performed in the desired manner when transferring heater elements which were folded into bundles approximately .025 inch in diameter and the diameter of the passage in the launching tube 10 was approximately .069 inch in diameter, the diameter of the passage in nozzle 12 was approximately .035 inch in diameter, the passage in the funnel bushing 13 was approximately .031 inch in diameter and the inside dimension of the cathode sleeve was .035 inch. The capacity of the vacuum pump 16 in that instance, was such as to maintain a negative pressure of approximately 21 inches of mercury in the chamber 14.

Since a heater element is resilient and is in the form of a folded bundle when presented to the launching tube 10 it has a tendency to expand against the inside of the tube. It is desired to have the inside dimension of the tube 10 a little larger than the passages in the nozzle and the funnel bushing in order to reduce the friction and permit the heater element to gain sufficient momentum to carry it to its final position. The passage in the funnel bushing 13 is preferably slightly smaller than the inside diameter of the cathode sleeve to insure that fragile heater elements will not be damaged by striking the edge of the sleeve.

In the operation of the apparatus of this invention, cathode sleeves of electron discharge devices, such as that illustrated at 2, are presented manually in a sequential manner in substantially gas-tight engagement with the bottom of the recess 15 of the funnel bushing 13. In timed relation with the presentation of cathode sleeves in engagement with the bushing 13, an operator manually places a heater element 1, in the folded bundle shape, in front of the mouth of the funnel 11 from where it is conveyed at accelerated velocity by the air stream through the launching tube 10. The momentum of the heater element projects it into the decelerating nozzle 12 where it is subjected to the decelerating action of the air stream flowing in the opposite direction. Because the air stream expands uniformly radially outwardly in the chamber 14 in the space between the end of the launching tube and the mouth of the nozzle, the heater element being conveyed will not be deflected from its path along the axis of the pneumatic conduit passageway. The heater element being conveyed will proceed across the air gap 18 between the outer end of the nozzle 12 and the mouth of the funnel bushing 13. Since the gap 18 is open to the atmosphere uniformly around the axis, the path of the projected heater element will not be deflected. The decelerating action of the stream of air in the nozzle 12 is supplemented by the friction between the heater element and the inside surface of a cathode sleeve in bringing the heater element to a gentle stop in the desired assembled relation without damage to the fragile heater element.

While the invention has been shown in but one form, it will be obvious to those skilled in the art that it is not so limited, but is susceptible of various changes and modifications without departing from the spirit thereof.

We claim as our invention:

1. Pneumatic conveying apparatus for assembling an article into a hollow portion of a sleeve, said apparatus comprising a first means for transporting said article from a predetermined position into said hollow portion, said first means including an entrance portion associated with said predetermined position and a discharge portion, a second means for creating a vacuum intermediate said entrance and discharge portions to provide a first flow of conveying medium to compel said article through said entrance portion and to provide a second flow of conveying medium through said discharge portion in a direction opposite to that of said first flow, and a third means having an enlarged opening and being spaced from and aligned with said discharge portion to substantially disassociate said hollow portion of said sleeve from said second flow of conveying medium through said discharge portion.

2. Pneumatic conveying apparatus for assembling an article into an open ended sleeve, said apparatus comprising a conduit means for transporting said article from a predetermined position into said sleeve, said conduit means including an entrance portion associated with said predetermined position and a discharge portion, a vacuum producing means operatively disposed intermediate said entrance and discharge portions to establish first and second flows of conveying medium respectively through said entrance and discharge portions in opposite directions, and a guide member having an enlarged inlet to receive said article and being spaced from and aligned with said discharge portion to substantially isolate said sleeve from said second flow of conveying medium through said discharge portion and to thereby prevent the withdrawal of said article from said sleeve.

3. Pneumatic conveying apparatus for assembling an article into an open ended sleeve, said apparatus comprising a first means including a tubular conduit for conveying said article from a predetermined position into said sleeve, second means operatively associated with said first means for creating a flow of conveying medium in said first means and a third means including a guiding member having an aperture therein, said guiding member being associated with said first means to inhibit the development of a low pressure zone of said conveying medium at said aperture and to thereby prevent the withdrawal of said article from said open ended sleeve after the insertion of said article, said aperture being aligned with said tubular conduit to direct said article into said opened ended sleeve.

References Cited by the Examiner
UNITED STATES PATENTS
2,842,923   7/58   Kjellsen _____ 302—2

SAMUEL F. COLEMAN, Primary Examiner.

ANDRES H. NIELSEN, Examiner.